United States Patent
Chen et al.

(10) Patent No.: US 12,497,247 B2
(45) Date of Patent: Dec. 16, 2025

(54) SYSTEM AND METHOD FOR POSITIONING SUSPECTED ARTICLE

(71) Applicants: Nuctech Company Limited, Beijing (CN); Tsinghua University, Beijing (CN)

(72) Inventors: Zhiqiang Chen, Beijing (CN); Li Zhang, Beijing (CN); Yuanjing Li, Beijing (CN); Qingping Huang, Beijing (CN); Yingjia Xu, Beijing (CN); Hui Ding, Beijing (CN); Yong Zhou, Beijing (CN); Junhao Liu, Beijing (CN); Weijun Guo, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 18/572,586

(22) PCT Filed: Jul. 20, 2023

(86) PCT No.: PCT/CN2023/108348
§ 371 (c)(1),
(2) Date: Dec. 20, 2023

(87) PCT Pub. No.: WO2024/032342
PCT Pub. Date: Feb. 15, 2024

(65) Prior Publication Data
US 2025/0229993 A1    Jul. 17, 2025

(30) Foreign Application Priority Data
Aug. 8, 2022 (CN) .......................... 202210946669.4

(51) Int. Cl.
*G01V 5/226* (2024.01)
*B65G 43/00* (2006.01)

(52) U.S. Cl.
CPC ............. *B65G 43/00* (2013.01); *G01V 5/226* (2024.01); *B65G 2201/0235* (2013.01)

(58) Field of Classification Search
CPC . B65G 43/00; B65G 2201/0235; G01V 5/226
See application file for complete search history.

(56) References Cited

U.S. PATENT DOCUMENTS

| | | |
|---|---|---|
| 6,480,271 B1 | 11/2002 | Cloud et al. |
| 10,571,598 B2 | 2/2020 | Zhang et al. |
| 2018/0180761 A1 | 6/2018 | Zhang et al. |

FOREIGN PATENT DOCUMENTS

| | | |
|---|---|---|
| CN | 106403842 A | 2/2017 |
| CN | 106645224 A | 5/2017 |

(Continued)

OTHER PUBLICATIONS

"International Application No. PCT/CN2023/108348, International Search Report dated Nov. 21, 2023", (Nov. 21, 2023), 5 pgs.

*Primary Examiner* — David P Porta
*Assistant Examiner* — Fani Polyzos Boosalis
(74) *Attorney, Agent, or Firm* — Schwegman Lundberg & Woessner, P.A.

(57) ABSTRACT

Provided are a system and a method for positioning a suspected article. The system includes a truss indicating mechanism defining a coordinate system having X, Y and Z directions perpendicular to each other. The truss indicating mechanism includes a first direction moving rail disposed on a truss body in one of the three directions; a second direction moving rail movably disposed on the first direction moving rail in a another of the three directions, the second direction moving rail is movable in the first direction relative to the first direction moving rail; and a ranging indicating device (Continued)

movably disposed on the second direction moving rail, the ranging indicating device is configured to be movable in the second direction relative to the second direction moving rail, and is configured to feed back position information of the suspected article in a to-be-inspected cargo by using coordinate information of the coordinate system.

20 Claims, 3 Drawing Sheets

(56) References Cited

FOREIGN PATENT DOCUMENTS

| | | | |
|---|---|---|---|
| CN | 106770166 A | | 5/2017 |
| CN | 207096133 U | * | 3/2018 |
| CN | 112396649 A | | 2/2021 |
| CN | 116224355 A | | 6/2023 |
| GB | 0816148 | | 10/2008 |

* cited by examiner

SYSTEM AND METHOD FOR POSITIONING SUSPECTED ARTICLE

PRIORITY CLAIM TO RELATED APPLICATIONS

This application is a U.S. national stage filing under 35 U.S.C. § 371 from International Application No. PCT/CN2023/108348, filed on Jul. 20, 2023, which claims the benefit under 35 U.S.C. 119 to Chinese Application No. 202210946669.4, filed on Aug. 8, 2022, the benefit of priority of each of which is claimed herein, and which applications and publication are hereby incorporated herein by reference in their entirety.

TECHNICAL FIELD

The present disclosure relates to the field of cargo safety inspection technology, and in particular, to a system and a method for positioning a suspected article.

BACKGROUND

An air cargo is mostly transported by a pallet (or container), and cargoes (or packages) are stacked on the pallet (or container) layer by layer. According to a workflow of air cargo security inspection, when a whole pallet (or container) is inspected by a security inspection apparatus and a suspected article is detected in a cargo on the pallet (or container), staff need to carry the cargo (or package) to an unpacking inspection region, and a manual inspection may be performed by security personnel to find the cargo (or package) where the suspected article is located, and a further inspection may be performed to confirm whether the suspected article is a contraband or dangerous cargo.

In an actual work process, a position of the suspected article may be determined by the staff through an image of the security inspection apparatus. However, since the pallet (or container) has a large size and there are many cargoes (or packages), it is difficult to find the cargo (or package) where the suspected article is located only through the image of the security inspection apparatus. In an extreme case, a comprehensive re-security inspection is required for all the cargoes (or packages) on the pallet (or inside the container).

It can be seen that a system and a method for positioning suspected article is urgently required, so as to conveniently indicate the position of the cargo (or package) where the suspected article is located, so that the security personnel may find the good (or package) where the suspected article is located and perform the unpacking inspection.

SUMMARY

An objective of the present disclosure is to solve at least one aspect of the above-mentioned problems and disadvantages existing in the prior art.

According to an aspect of the present disclosure, a system for positioning a suspected article is provided, including: a truss indicating mechanism configured to define a coordinate system, the coordinate system has an X direction, a Y direction and a Z direction which are perpendicular to each other; the truss indicating mechanism includes: a truss body; a first direction moving rail disposed on the truss body and arranged in a first direction among the X direction, the Y direction and the Z direction; a second direction moving rail movably disposed on the first direction moving rail and arranged in a second direction among the X direction, the Y direction and the Z direction, the second direction moving rail is configured to be movable in the first direction relative to the first direction moving rail; and a ranging indicating device movably disposed on the second direction moving rail, the ranging indicating device is configured to be movable in the second direction relative to the second direction moving rail, and is configured to feed back position information of the suspected article in a to-be-inspected cargo by using coordinate information of the coordinate system.

According to an exemplary embodiment of the present disclosure, the position information of the suspected article includes: coordinate position of the suspected article in the coordinate system, and/or a distance of the suspected article relative to the ranging indicating device in the Z direction.

According to an exemplary embodiment of the present disclosure, the first direction is the X direction, and the second direction is the Y direction.

According to an exemplary embodiment of the present disclosure, the first direction is the Z direction, and the second direction is the X direction or the Y direction.

According to an exemplary embodiment of the present disclosure, the system further includes: a positioning platform defining one and same coordinate system as the truss indicating mechanism, the positioning platform is configured to place the to-be-inspected cargo on a plane jointly defined by the X direction and the Y direction; the positioning platform includes an X-direction limiting baffle arranged in the X direction and a Y-direction limiting baffle arranged in the Y direction, and the X-direction limiting baffle and the Y-direction limiting baffle are configured to jointly define a position corresponding to a coordinate origin of the coordinate system.

According to an exemplary embodiment of the present disclosure, the positioning platform is provided with a power mechanism configured to move the to-be-inspected cargo on the positioning platform in at least one of the X direction and the Y direction; and/or the positioning platform is provided with a non-power mechanism configured to move the to-be-inspected cargo on the positioning platform in at least one of the X direction and the Y direction.

According to an exemplary embodiment of the present disclosure, the ranging indicating device is a laser ranging indicator.

According to an exemplary embodiment of the present disclosure, the system further includes: a CT-type cargo inspection mechanism defining one and same coordinate system as the truss indicating mechanism, the CT-type cargo inspection mechanism is configured to scan the to-be-inspected cargo placed on the positioning platform, and is configured to feed back the position information of suspected article in the to-be-inspected cargo.

According to an exemplary embodiment of the present disclosure, the system further includes: a suspected article placing position disposed close to the positioning platform, the suspected article placing position is configured to place the suspected article taken out from the to-be-inspected cargo; and a non-suspected article placing position disposed close to the positioning platform, the non-suspected article placing position is configured to place a non-suspected article taken out from the to-be-inspected cargo, According to an exemplary embodiment of the present disclosure, the system further includes: a control mechanism configured to manipulate the ranging indicating device and/or the positioning platform.

According to another aspect of the present disclosure, a method for positioning a suspected article, which is applied to the system for positioning the suspected article described in any of the above-mentioned embodiments is provided, including: placing the to-be-inspected cargo at a truss indicating mechanism, so that a position of the to-be-inspected cargo corresponds to the coordinate information of the coordinate system defined by the truss indicating mechanism; and moving the ranging indicating device in at least one of the first direction and the second direction relative to the truss indicating mechanism, so as to determine the position information of the suspected article through the ranging indicating device.

According to an exemplary embodiment of the present disclosure, the position information of the suspected article includes: coordinate position of the suspected article in the coordinate system, and/or a distance of the suspected article relative to the ranging indicating device in the Z direction.

According to an exemplary embodiment of the present disclosure, the first direction is the X direction, and the second direction is the Y direction.

According to an exemplary embodiment of the present disclosure, the first direction is the Z direction, and the second direction is the X direction or the Y direction.

According to an exemplary embodiment of the present disclosure, the system further includes: a positioning platform defining one and same coordinate system as the truss indicating mechanism, the positioning platform is configured to place the to-be-inspected cargo on a plane jointly defined by the X direction and the Y direction; the positioning platform includes an X-direction limiting baffle arranged in the X direction and a Y-direction limiting baffle arranged in the Y direction, and the X-direction limiting baffle and the Y-direction limiting baffle are configured to jointly define a position corresponding to a coordinate origin of the coordinate system; and in the method, the placing to-be-inspected cargo at a truss indicating mechanism further includes: placing the to-be-inspected cargo on the plane of the positioning platform jointly defined by the X direction and the Y direction, and positioning a position of the to-be-inspected cargo on the positioning platform by using the X-direction limiting baffle and the Y-direction limiting baffle.

According to an exemplary embodiment of the present disclosure, the positioning platform is provided with a power mechanism configured to move the to-be-inspected cargo on the positioning platform in at least one of the X direction and the Y direction; and/or the positioning platform is provided with a non-power mechanism configured to move the to-be-inspected cargo on the positioning platform in at least one of the X direction and the Y direction, and in the method, the placing the to-be-inspected cargo at a truss indicating mechanism further includes: moving the to-be-inspected cargo relative to the positioning platform by using the power mechanism; and/or moving the to-be-inspected cargo relative to the positioning platform by using the non-power mechanism.

According to an exemplary embodiment of the present disclosure, the ranging indicating device is a laser ranging indicator.

According to an exemplary embodiment of the present disclosure, the system further includes: a CT-type cargo inspection mechanism defining one and same coordinate system as the truss indicating mechanism, the CT-type cargo inspection mechanism is configured to scan the to-be-inspected cargo placed on the positioning platform and is configured to feed back the position information of the suspected article in the to-be-inspected cargo; and the method further includes: scanning the to-be-inspected cargo placed on the positioning platform by using the CT-type cargo inspection mechanism; and feeding back the position information of the suspected article in the to-be-inspected cargo by using the CT-type cargo inspection mechanism.

According to an exemplary embodiment of the present disclosure, the system further includes: a suspected article placing position disposed close to the positioning platform, the suspected article placing position is configured to place the suspected article taken out from the to-be-inspected cargo; and a non-suspected article placing position disposed close to the positioning platform, the non-suspected article placing position is configured to place a non-suspected article taken out from the to-be-inspected cargo; and the method further includes: taking the suspected article out from the to-be-inspected cargo and placing the suspected article at the suspected article placing position; and taking the non-suspected article out from the to-be-inspected cargo and placing the suspected article at the non-suspected article placing position.

According to an exemplary embodiment of the present disclosure, the system further includes: a control mechanism configured to manipulate the ranging indicating device and/or the positioning platform, and the method further includes: manipulating the ranging indicating device and/or the positioning platform by using the control mechanism.

Through the system and the method for positioning the suspected article provided by various exemplary embodiments of the present disclosure, the security personnel may conveniently find out the position of the cargo (or package) where the suspected article is located, so as to facilitate the security personnel to find out the cargo (or package) where the suspected article is located and perform an unpacking inspection, which may thus avoid redundant and repetitive security inspection operations, improve an efficiency and save manpower.

Other objectives and advantages of the present disclosure will be apparent through the following descriptions of the present disclosure with reference to accompanying drawings, so as to facilitate a comprehensive understanding of the present disclosure.

DETAILED DESCRIPTION OF EMBODIMENTS

Figure 1:
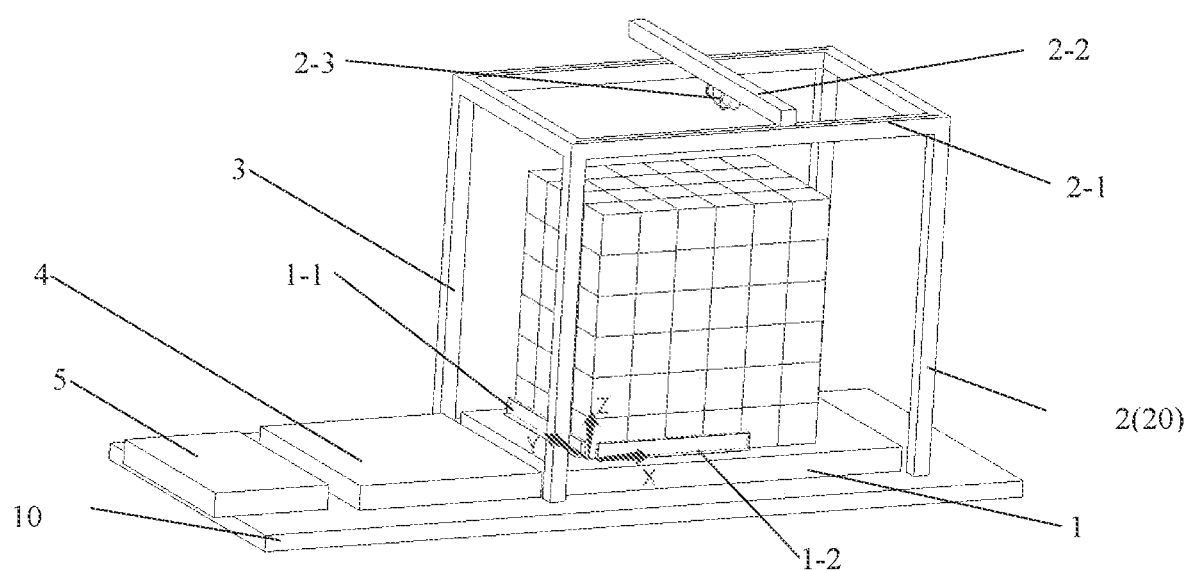
FIG. 1 is a three-dimensional schematic diagram of a system for positioning a suspected article according to an exemplary embodiment of the present disclosure.

The technical solution of the present disclosure will be further described in detail below through embodiments with reference to accompanying drawings. In the specification, the same or similar reference numerals indicate the same or similar components. The following descriptions of embodiments of the present disclosure with reference to the accompanying drawings are intended to explain the general inventive concept of the present disclosure, and should not be construed as limiting the present disclosure.

In addition, in the following detailed descriptions, for the convenience of explanation, many specific details are set forth to provide a comprehensive understanding of embodiments of the present disclosure. It may be apparent, however, that one or more embodiments may be implemented without the specific details. In other cases, well-known structures and devices are illustrated to simplify the accompanying drawings.

According to an overall technical concept of the present disclosure, there is provided a system for positioning a suspected article, including: a truss indicating mechanism defining a coordinate system, where the coordinate system includes an X direction, a Y direction and a Z direction which are perpendicular to each other; a first direction moving rail disposed on the truss indicating mechanism and arranged in a first direction among the X direction, the Y direction and the Z direction; a second direction moving rail movably disposed on the first direction moving rail and arranged in a second direction among the X direction, the Y direction and the Z direction, where the second direction moving rail is configured to be movable in the first direction relative to the first direction moving rail; and a ranging indicating device movably disposed on the second direction moving rail, the ranging indicating device is configured to be movable in the second direction relative to the second direction moving rail, and is configured to feed back position information of a suspected article in a to-be-inspected cargo by using coordinate information of the coordinate system. According to another general technical concept of the present disclosure, there is provided a method for positioning a suspected article, which is applied to the above-mentioned system for positioning the suspected article, including: a to-be-inspected cargo is placed at a truss indicating mechanism, so that a position of the to-be-inspected cargo may correspond to coordinate information of a coordinate system defined by the truss indicating mechanism; and a ranging indicating device in at least one of a first direction and a second direction relative to the truss indicating mechanism, so that position information of a suspected article is determined through the ranging indicating device.

Figure 2:
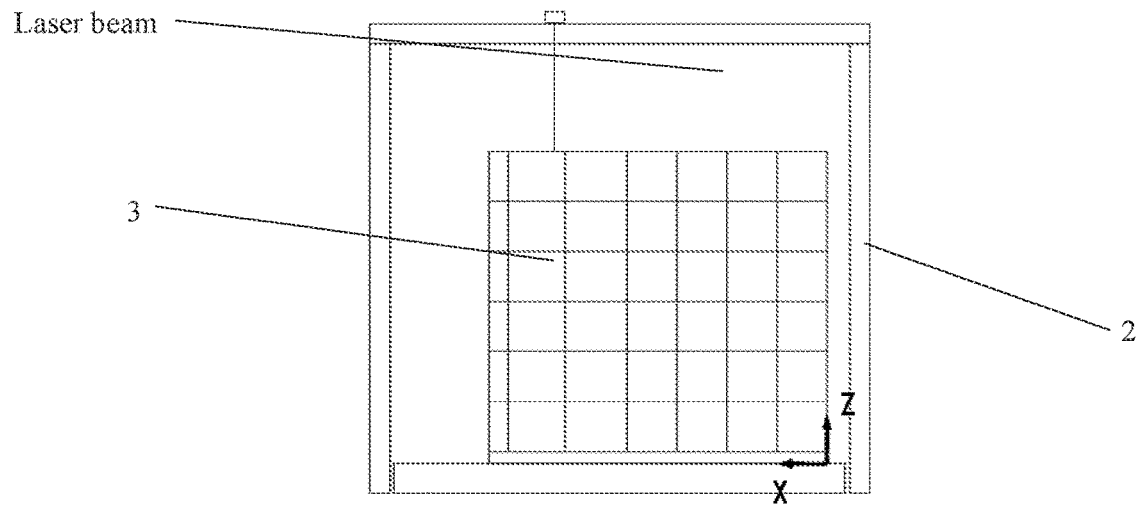
FIG. 2 is a side view of the system for positioning the suspected article shown in FIG. 1.
Figure 3:
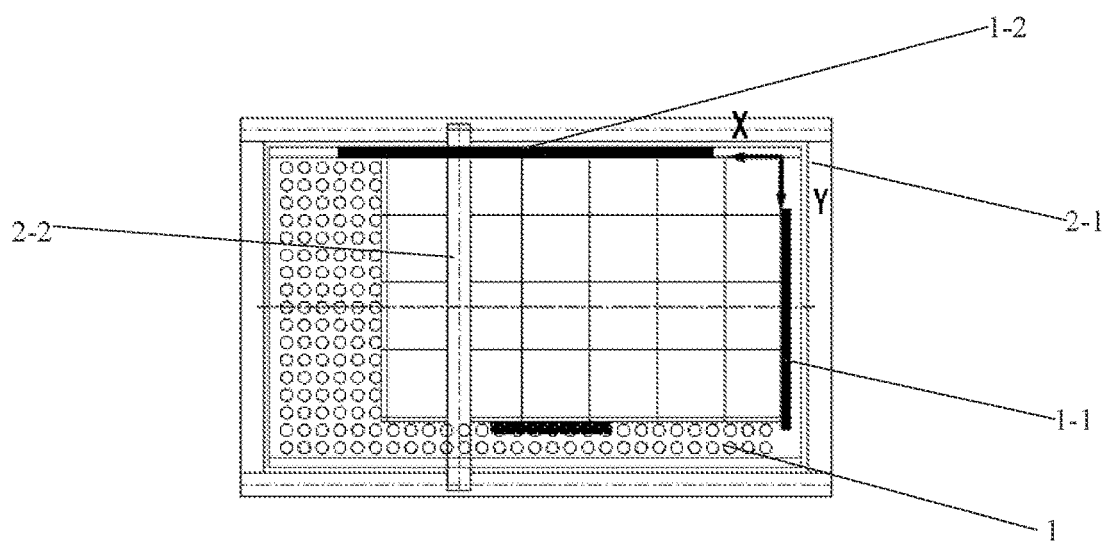
FIG. 3 is a top view of the system for positioning the suspected article shown in FIG. 1.

FIG. 1 is a three-dimensional schematic diagram of a system for positioning a suspected article according to an exemplary embodiment of the present disclosure, and FIG. 2 and FIG. 3 are a side view and a top view of the system for positioning the suspected article shown in FIG. 1, respectively.

For the convenience of description, the "to-be-inspected cargo" described herein includes, but is not limited to, an aviation pallet (or container) and cargoes (or packages) stacked on the aviation pallet (or container) layer by layer, and the "suspected article" described herein includes, but is not limited to, a cargo (or package) on the aviation pallet (or inside the container) which is suspected after undergoing a security inspection. In the illustrated exemplary embodiments, the packages stacked on the pallet are used as an example of the to-be-inspected cargo, and the suspected package is used as an example of the suspected article.

According to an exemplary embodiment of the present disclosure, referring to FIG. 1 to FIG. 3, there is provided a system for positioning a suspected article. In the illustrated exemplary embodiments, the system for positioning the suspected article mainly includes: a truss indicating mechanism 2, a positioning platform 1, a CT-type cargo inspection mechanism (not shown), a non-suspected article placing position 4, a suspected article placing position 5, a control mechanism (not shown), etc.

According to an exemplary embodiment of the present disclosure, as shown in FIG. 1 to FIG. 3, the truss indicating mechanism 2 defines a coordinate system (e.g., an XYZ three-dimensional coordinate system as shown in FIG. 1 to FIG. 3), and the coordinate system includes an X direction, a Y direction and a Z direction which are perpendicular to each other. The truss indicating mechanism 2 includes a truss body 20, a first direction moving rail 2-1, a second direction moving rail 2-2 and a ranging indicating device 2-3. The first direction moving rail 2-1 is disposed on the truss body 20 and arranged in a first direction among the X direction, the Y direction and the Z direction. The second direction moving rail 2-2 is movably disposed on the first direction moving rail 2-1 and arranged in a second direction among the X direction, the Y direction and the Z direction, and the second direction moving rail 2-2 is configured to be movable in the first direction relative to the first direction moving rail 2-1. The ranging indicating device 2-3 is movably disposed on the second direction moving rail 2-2, and the ranging indicating device 2-3 is configured to be movable in the second direction relative to the second direction moving rail 2-2, and is configured to feed back position information of the suspected article in a to-be-inspected cargo 3 by using coordinate information of the coordinate system. According to the present disclosure, based on the coordinate system defined by the truss indicating mechanism 2, the ranging indicating device 2-3 moves in the first direction and/or the second direction and performs ranging, which may effectively feed back the position information of the suspected article in the to-be-inspected cargo 3 by using the coordinate information of the coordinate system.

According to the present disclosure, the truss body 20 may be made of a rigid or hard material. The first direction moving rail 2-1 and the second direction moving rail 2-2 disposed on the truss body 20 may use a guide rail, a slide rail or the like.

According to the present disclosure, the ranging indicating device 2-3 is configured to indicate the position information of the suspected article and may feed back a distance between the suspected article and the device itself. For example, the position information of the suspected article includes, but is not limited to: a coordinate position of the suspected article in the coordinate system, and/or a distance of the suspected article relative to the ranging indicating device in the Z direction of the coordinate system. For example, the ranging indicating device 2-3 may use a laser ranging indicator that may emit a red (or other indicating color) laser beam.

In exemplary embodiments shown in FIG. 1 to FIG. 3, the above-mentioned first direction is the X direction, the above-mentioned second direction is the Y direction, and the ranging indicating device 2-3 is a Z direction ranging indicator. That is, the ranging indicating device 2-3 is movably installed on the Y-direction moving rail 2-2, and may move along the Y-direction moving rail 2-2 in the Y direction and emit a laser beam in the Z direction. At the same time, the Y-direction moving rail 2-2 is movably installed on the X-direction moving rail 2-1 and may move in the X direction. Therefore, the laser beam emitted by the ranging indicating device 2-3 may indicate X and Y coordinate positions of the suspected article in the coordinate system by moving the ranging indicating device 2-3 in the first direction and/or the second direction. At the same time, the laser ranging may indicate a distance of the suspected article relative to the ranging indicating device 2-3 in the Z direction of the coordinate system. Through the above-mentioned structure and operation, security personnel may gradually narrow a distance between the suspected package and a top cargo by removing upper cargoes of the suspected package until the suspected package is found.

Figure 4:
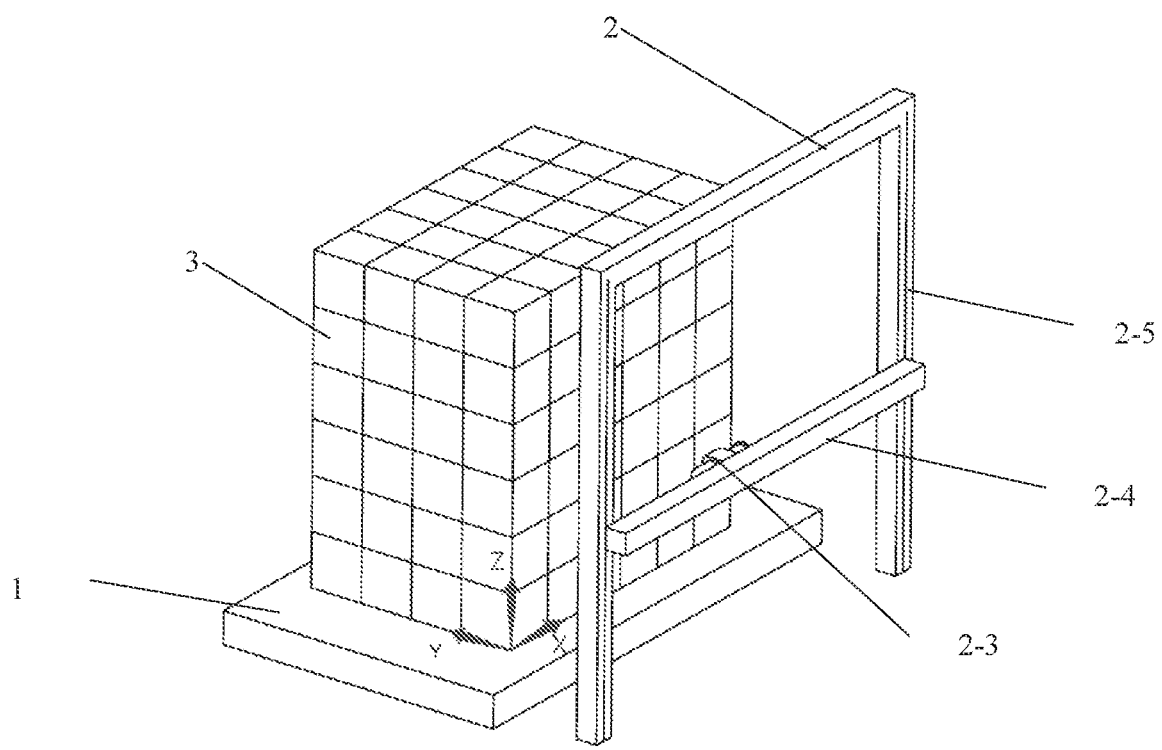
FIG. 4 is a three-dimensional schematic diagram of a system for positioning a suspected article according to another exemplary embodiment of the present disclosure.

According to the present disclosure, a direction indicated by the truss indicating mechanism 2 may be changed according to actual needs. That is, the above-mentioned first direction may be the Z direction, and the above-mentioned second direction may be the X direction or the Y direction. For example, in exemplary embodiments shown in FIG. 4, the above-mentioned first direction is the Z direction, the above-mentioned second direction is the X direction, and the ranging indicating device 2-3 is a Y direction ranging indicator. Specifically, the ranging indicating device 2-3 is movably installed on the X-direction moving rail 2-4, and may move along the X-direction moving rail 2-4 in the X direction and emit a laser beam in the Y direction. At the same time, the X-direction moving rail 2-4 is movably installed on a Z-direction moving rail 2-5 and may move in the Z direction. Therefore, the laser beam emitted by the ranging indicating device 2-3 may indicate the position of the suspected article in X and Z coordinates in the coordinate system by moving the ranging indicating device 2-3 in the first direction and/or the second direction. At the same time, the laser ranging may indicate a distance of the suspected article relative to the ranging indicating device 2-3 in the Y direction of the coordinate system. Certainly, in exemplary embodiments not shown, the above-mentioned first direction is the Z direction, and the above-mentioned second direction is the Y direction. The ranging indicating device may emit a laser beam in the X direction, and may thus indicate the position of the suspected article in Y and Z coordinates in the coordinate system and realize ranging in the X direction, and the details of which will not be repeated here.

According to an exemplary embodiment of the present disclosure, as shown in FIG. 1 to FIG. 3, the positioning platform 1 may be disposed on the ground 10. The positioning platform 1 defines one and same coordinate system (i.e., the XYZ three-dimensional coordinate system) as the coordinate system of the truss indicating mechanism 2. That is, the coordinate system defined by the positioning platform 1 coincides with the coordinate system defined by the truss indicating mechanism 2. The positioning platform 1 is configured to place the to-be-inspected cargo on a plane jointly defined by the X direction and the Y direction. The positioning platform 1 includes an X-direction limiting baffle 1-2 arranged in the X direction and a Y-direction limiting baffle 1-1 arranged in the Y direction, and the X-direction limiting baffle 1-2 and the Y-direction limiting baffle 1-1 are configured to jointly define a position corresponding to a coordinate origin of the coordinate system. That is, the coordinate origin of the coordinate system is defined by an intersection point of the X-direction limiting baffle 1-2 and the Y-direction limiting baffle 1-1. In this way, after the pallet is placed on the positioning platform 1, a bottom surface of the pallet is in contact with an upper surface of the positioning platform 1. That is, a Z-coordinate alignment (point 0 of the Z coordinate) of the pallet may be realized. By pushing the pallet, two sides of the pallet respectively abut against the X-direction limiting baffle 1-2 and the Y-direction limiting baffle 1-1 of the positioning platform 1, which may realize an alignment (point 0 of the Y coordinate and point 0 of the X coordinate) of the Y coordinate and the X coordinate of the pallet, so that an alignment of X, Y and Z coordinates of the pallet and X, Y and Z coordinates of the positioning platform 1 may be realized.

According to the present disclosure, the positioning platform 1 is provided with a power mechanism used to move the to-be-inspected cargo on the positioning platform in at least one of the X direction and the Y direction; and/or the positioning platform 1 is provided with a non-power mechanism used to move the to-be-inspected cargo on the positioning platform in at least one of the X direction and the Y direction. For example, the positioning platform 1 is provided with the non-powered mechanism such as a universal ball (or universal wheel), etc. For another example, the positioning platform 1 is provided with the power mechanism such as a power rolling drum, a power rolling wheel, etc. For yet another example, the positioning platform 1 is provided with both the non-power mechanisms such as the universal ball (or universal wheel), etc. and the power mechanism such as the power rolling drum, the power rolling wheel, etc. In this way, when the pallet is placed on the positioning platform 1, the pallet may be freely pushed by the non-power mechanism and/or may be directionally moved by the power mechanism.

In an alternative embodiment, the positioning platform may not be used. For example, the positioning platform may be replaced by scribing on the ground, and a rough positioning may also be realized by placing with an external force. Although an accuracy thereof is low, a basic function may be also realized.

According to an exemplary embodiment of the present disclosure, the CT-type cargo inspection mechanism (not shown) defines one and same coordinate system (i.e., the XYZ three-dimensional coordinate system shown in FIG. 1 to FIG. 3) as the coordinate system of the truss indicating mechanism 2. That is, the coordinate system defined by the CT-type cargo inspection mechanism coincides with both the coordinate system defined by the positioning platform 1 and the coordinate system defined by the truss indicating mechanism 2. In this way, a coordinate origin of a scanned image scanned by the CT-type cargo inspection mechanism may be used as the coordinate origin of the coordinate system. The CT-type cargo inspection mechanism is configured to scan the to-be-inspected cargo placed on the positioning platform 1 and is configured to feed back the position information of the suspected article in the to-be-inspected cargo. In this way, a digital model of the to-be-inspected cargo is established by scanning and identifying the to-be-inspected cargo using the CT-type cargo inspection mechanism, and length, width and height dimensions represented by each pixel are fixed. The CT-type cargo inspection mechanism may indicate a position of the suspected package in a certain (some) pixel point(s), and a physical coordinate of the suspected package may be given through the number of pixels.

In addition, according to an exemplary embodiment of the present disclosure, as shown in FIG. 1 to FIG. 3, the non-suspected article placing position 4 may be disposed near the positioning platform 1 and is configured to place a non-suspected article taken out from the to-be-inspected cargo. The suspected article placing position 5 may be disposed near the positioning platform 1 and is configured to place the suspected article taken out from the to-be-inspected cargo.

In addition, according to an exemplary embodiment of the present disclosure, the control mechanism (not shown) is configured to manipulate the ranging indicating device 2-3 and/or the positioning platform 1. For example, the control mechanism may take a form of a touch control screen. For example, the control mechanism may manipulate a movement of the ranging indicating device 2-3 in the first direction and/or the second direction, and may also manipulate a laser ranging action of the ranging indicating device 2-3. For another example, the control mechanism may manipulate the power mechanism in the positioning platform 1 to realize a movement of the to-be-inspected cargo on the positioning platform 1.

According to the present disclosure, there is further provided a method for positioning a suspected article, which is applied to the system for positioning the suspected article described in any of the above-mentioned embodiments, including:

- a to-be-inspected cargo is placed at a truss indicating mechanism, so that a position of the to-be-inspected cargo may correspond to coordinate information of a coordinate system defined by the truss indicating mechanism; and
- a ranging indicating device is moved in at least one of a first direction and a second direction relative to the truss indicating mechanism, so that position information of the suspected article is determined through the ranging indicating device.

Further, in the method for positioning the suspected article, the step of placing the to-be-inspected cargo at the truss indicating mechanism may further include: the to-be-inspected cargo is placed on a plane of a positioning platform jointly defined by the X direction and the Y direction, and the position of the to-be-inspected cargo on the positioning platform is positioned by using a X-direction limiting baffle and a Y-direction limiting baffle.

Further, in the method for positioning the suspected article, the step of placing the to-be-inspected cargo at the truss indicating mechanism may further include: the to-be-inspected cargo is moved relative to the positioning platform by using a power mechanism; and/or the to-be-inspected cargo is moved relative to the positioning platform by using a non-power mechanism.

Further, the method for positioning the suspected article may further include: the to-be-inspected cargo placed on the positioning platform is scanned by using a CT-type cargo inspection mechanism; and the position information of the suspected article in the to-be-inspected cargo is fed back by using the CT-type cargo inspection mechanism.

Further, the method for positioning the suspected article may further include: the suspected article is taken out from the to-be-inspected cargo and placed at the suspected article placing position; and the non-suspected article is taken out from the to-be-inspected cargo and placed at the non-suspected article placing position.

Further, the method for positioning the suspected article may further include: the ranging indicating device and/or the positioning platform are manipulated by using a control mechanism.

An example of the method for positioning the suspected article according to the present disclosure will be described below in conjunction with exemplary embodiments applied to the system for positioning the suspected article shown in FIG. 1 to FIG. 3.

Firstly, the to-be-inspected article 3 is placed on the positioning platform 1, and the to-be-inspected article 3 is pushed until the to-be-inspected article 3 abuts against the X-direction limiting baffle 1-2 and the Y-direction limiting baffle 1-1, respectively. Secondly, the ranging indicating device 2-3 moves along the first direction moving rail 2-1 and the second direction moving rail 2-2, and the laser beam emitted by the ranging indicating device 2-3 may indicate X and Y coordinate positions of the suspected package. Finally, the distance between the suspected package and the top cargo is given on a display screen by laser ranging. In this way, the security personnel may gradually narrow the distance between the suspected package and the top cargo by removing the upper cargo of the suspected package until the suspected package is found.

Through the system and the method for positioning the suspected article provided by various exemplary embodiments of the present disclosure, the security personnel may conveniently find out the position of cargo (or packages) where the suspected article is located, so as to facilitate the security personnel to find out the cargo (or packages) where the suspected article is located and perform the unpacking inspection, which may thus avoid redundant and repetitive security inspection operations, improve an efficiency and save manpower.

Those skilled in the art may understand that the above-described embodiments are all exemplary and may be improved by those skilled in the art, and the structures described in various embodiments may be freely combined without a conflict in structure or principle.

Although the present disclosure has been described with reference to the accompanying drawings, embodiments disclosed in the accompanying drawings are intended to illustrate preferred embodiments of the present disclosure and should not be construed as limiting the present disclosure.

Although some embodiments of the general inventive concept of the present disclosure have been shown and described, those skilled in the art will understand that changes may be made to these embodiments without departing from the principle and spirit of the general inventive concept of the present disclosure, and the scope of the present disclosure is defined by the claims and their equivalents.

It should be noted that the word "including" does not exclude a presence of other elements or steps, and the word "a" or "an" does not exclude a presence of a plurality of the elements. In addition, any element reference numerals in the claims should not be construed as limiting the scope of the present disclosure.

What is claimed is:

1. A system for positioning a suspected article, comprising: a truss indicating mechanism configured to define a coordinate system, wherein the coordinate system has an X direction, a Y direction and a Z direction which are perpendicular to each other; wherein the truss indicating mechanism comprises:
    a truss body;
    a first direction moving rail disposed on the truss body and arranged in a first direction among the X direction, the Y direction and the Z direction;
    a second direction moving rail movably disposed on the first direction moving rail and arranged in a second direction among the X direction, the Y direction and the Z direction, wherein the second direction moving rail is configured to be movable in the first direction relative to the first direction moving rail; and
    a ranging indicating device movably disposed on the second direction moving rail, wherein the ranging indicating device is configured to be movable in the second direction relative to the second direction moving rail, and is configured to feed back position information of the suspected article in a to-be-inspected cargo by using coordinate information of the coordinate system.

2. The system for positioning the suspected article according to claim 1,
    wherein the position information of the suspected article comprises:

coordinate position of the suspected article in the coordinate system, and/or a distance of the suspected article relative to the ranging indicating device in the Z direction.

3. The system for positioning the suspected article according to claim 1,
wherein the first direction is the X direction, and the second direction is the Y direction.

4. The system for positioning the suspected article according to claim 1,
wherein the first direction is the Z direction, and the second direction is the X direction or the Y direction.

5. The system for positioning the suspected article according to claim 1, further comprising:
a positioning platform defining one and same coordinate system as the truss indicating mechanism, wherein the positioning platform is configured to place the to-be-inspected cargo on a plane jointly defined by the X direction and the Y direction;
wherein the positioning platform comprises an X-direction limiting baffle arranged in the X direction and a Y-direction limiting baffle arranged in the Y direction, and the X-direction limiting baffle and the Y-direction limiting baffle are configured to jointly define a position corresponding to a coordinate origin of the coordinate system.

6. The system for positioning the suspected article according to claim 5,
wherein the positioning platform is provided with a power mechanism configured to move the to-be-inspected cargo on the positioning platform in at least one of the X direction and the Y direction; and/or
wherein the positioning platform is provided with a non-power mechanism configured to move the to-be-inspected cargo on the positioning platform in at least one of the X direction and the Y direction.

7. The system for positioning the suspected article according to claim 5,
wherein the ranging indicating device is a laser ranging indicator.

8. The system for positioning the suspected article according to claim 5, further comprising:
a CT-type cargo inspection mechanism defining one and same coordinate system as the truss indicating mechanism, wherein the CT-type cargo inspection mechanism is configured to scan the to-be-inspected cargo placed on the positioning platform, and is configured to feed back the position information of suspected article in the to-be-inspected cargo.

9. The system for positioning the suspected article according to claim 5, further comprising:
a suspected article placing position disposed close to the positioning platform, wherein the suspected article placing position is configured to place the suspected article taken out from the to-be-inspected cargo; and
a non-suspected article placing position disposed close to the positioning platform, wherein the non-suspected article placing position is configured to place a non-suspected article taken out from the to-be-inspected cargo.

10. The system for positioning the suspected article according to claim 5, further comprising:
a control mechanism configured to manipulate the ranging indicating device and/or the positioning platform.

11. A method for positioning a suspected article, which is applied to the system for positioning the suspected article according to claim 1, comprising:

placing the to-be-inspected cargo at a truss indicating mechanism, so that a position of the to-be-inspected cargo corresponds to the coordinate information of the coordinate system defined by the truss indicating mechanism; and
moving the ranging indicating device in at least one of the first direction and the second direction relative to the truss indicating mechanism, so as to determine the position information of the suspected article through the ranging indicating device.

12. The method for positioning the suspected article according to claim 11,
wherein the position information of the suspected article comprises:
coordinate position of the suspected article in the coordinate system, and/or
a distance of the suspected article relative to the ranging indicating device in the Z direction.

13. The method for positioning the suspected article according to claim 11,
wherein the first direction is the X direction, and the second direction is the Y direction.

14. The method for positioning the suspected article according to claim 11,
wherein the first direction is the Z direction, and the second direction is the X direction or the Y direction.

15. The method for positioning the suspected article according to claim 11, wherein the system for the suspected article further comprises: a positioning platform defining one and same coordinate system as the truss indicating mechanism, wherein the positioning platform is configured to place the to-be-inspected cargo on a plane jointly defined by the X direction and the Y direction; wherein the positioning platform comprises an X-direction limiting baffle arranged in the X direction and a Y-direction limiting baffle arranged in the Y direction, and the X-direction limiting baffle and the Y-direction limiting baffle are configured to jointly define a position corresponding to a coordinate origin of the coordinate system; and
wherein in the method for positioning the suspected article, the placing to-be-inspected cargo at a truss indicating mechanism further comprises:
placing the to-be-inspected cargo on the plane of the positioning platform jointly defined by the X direction and the Y direction, and
positioning a position of the to-be-inspected cargo on the positioning platform by using the X-direction limiting baffle and the Y-direction limiting baffle.

16. The method for positioning the suspected article according to claim 15, wherein the positioning platform is provided with a power mechanism configured to move the to-be-inspected cargo on the positioning platform in at least one of the X direction and the Y direction; and/or wherein the positioning platform is provided with a non-power mechanism configured to move the to-be-inspected cargo on the positioning platform in at least one of the X direction and the Y direction; and
wherein in the method for positioning the suspected article, the placing the to-be-inspected cargo at a truss indicating mechanism further comprises:
moving the to-be-inspected cargo relative to the positioning platform by using the power mechanism; and/or
moving the to-be-inspected cargo relative to the positioning platform by using the non-power mechanism.

17. The method for positioning the suspected article according to claim 15, wherein the ranging indicating device is a laser ranging indicator.

18. The method for positioning the suspected article according to claim 15, wherein the system for positioning the suspected article further comprises: a CT-type cargo inspection mechanism defining one and same coordinate system as the truss indicating mechanism, wherein the CT-type cargo inspection mechanism is configured to scan the to-be-inspected cargo placed on the positioning platform and is configured to feed back the position information of the suspected article in the to-be-inspected cargo; and wherein the method for positioning the suspected article further comprises:

scanning the to-be-inspected cargo placed on the positioning platform by using the CT-type cargo inspection mechanism; and feeding back the position information of the suspected article in the to-be-inspected cargo by using the CT-type cargo inspection mechanism.

19. The method for positioning the suspected article according to claim 15, wherein the system for positioning the suspected article further comprises: a suspected article placing position disposed close to the positioning platform, wherein the suspected article placing position is configured to place the suspected article taken out from the to-be-inspected cargo; and a non-suspected article placing position disposed close to the positioning platform, wherein the non-suspected article placing position is configured to place a non-suspected article taken out from the to-be-inspected cargo; and wherein the method for positioning the suspected article further comprises:

taking the suspected article out from the to-be-inspected cargo and placing the suspected article at the suspected article placing position; and taking the non-suspected article out from the to-be-inspected cargo and placing the suspected article at the non-suspected article placing position.

20. The method for positioning the suspected article according to claim 15, wherein the system for positioning the suspected article further comprises: a control mechanism configured to manipulate the ranging indicating device and/or the positioning platform, and wherein the method for positioning the suspected article further comprises:

manipulating the ranging indicating device and/or the positioning platform by using the control mechanism.

* * * * *